United States Patent [19]

Haller et al.

[11] Patent Number: 4,752,639

[45] Date of Patent: Jun. 21, 1988

[54] FLEXIBLE-TO-SOFT SHAPED ARTICLES CONTAINING A VINYL CHLORIDE-ACRYLIC ACID ESTER GRAFT COPOLYMER

[75] Inventors: Ingo Haller, Burghausen, Fed. Rep. of Germany; Georg Haberl, Mattighofen, Austria

[73] Assignee: Wacker-Chemie GmbH, Fed. Rep. of Germany

[21] Appl. No.: 930,357

[22] Filed: Nov. 12, 1986

[30] Foreign Application Priority Data

Dec. 3, 1985 [DE] Fed. Rep. of Germany ....... 3542694

[51] Int. Cl.$^4$ ............................................. C08L 75/00
[52] U.S. Cl. ........................................ 525/66; 525/64; 525/67; 525/71; 525/74; 525/80
[58] Field of Search ...................... 525/66, 317, 329.7, 525/64, 67, 71, 74, 80

[56] References Cited

U.S. PATENT DOCUMENTS 4,383,071 5/1983 Lawson et al. ................. 525/317 X

FOREIGN PATENT DOCUMENTS 1153937 6/1969 United Kingdom .

Primary Examiner—Theodore E. Pertilla
Attorney, Agent, or Firm—Bierman & Muserlian

[57] ABSTRACT

A flexible to soft shaped article containing a vinyl chloride-acrylic acid ester graft copolymer containing 20 to 60% by weight of acrylic acid ester polymer and 40 to 80% by weight of vinyl chloride and 0 to 30% by weight of other ethylenically unsaturated comonomers copolymerizable with vinyl chloride grafted thereon and optionally containing at least one member of the group consisting of other plastics, fillers, processing aids and conventional additives, the weight percentages being based on the total weight of the graft copolymer and optionally at least one additional polymer selected from the group consisting of polymers of high heat distortion resistance, polymers which lower the Shore hardness, polymers imparting elastomeric properties.

23 Claims, No Drawings

FLEXIBLE-TO-SOFT SHAPED ARTICLES CONTAINING A VINYL CHLORIDE-ACRYLIC ACID ESTER GRAFT COPOLYMER

STATE OF THE ART

The use of graft copolymers of vinyl chloride and acrylic acid esters to produce hard, tough shaped articles which are aging-resistant and weathering-resistant is known and the best results in this respect are obtained if the molding materials used to produce the shaped articles contain about 5 to 6% by weight of polymerized acrylic acid esters relative to polymerized vinyl chloride. In principle, it is immaterial whether the graft copolymer is used in the pure form or is added as a modifier resin which itself has a higher content of acrylic acid esters to a conventional thermoplastic, for example PVC (polyvinyl chloride).

For practical reasons, many processors prefer the latter approach which allows them to start from so-called high-impact concentrates and to adjust the impact strength themselves within certain limits by blending with the thermoplastic. The amounts used of such additives are, relative to the thermoplastic, for example PVC homopolymer, preferably 7 to 15% by weight. This in turn corresponds to a content of about 5 to 6% by weight of polymerized acrylate as the effective high-impact modifier relative to polymerized vinyl chloride (VC). Very good results are achieved with high-impact modifier resins which have been produced by grafting vinyl chloride onto polybutyl acrylate and typical uses of such high-impact-modified compositions are as window profiles and panels or profiles for external cladding of buildings.

OBJECTS OF THE INVENTION

It is an object of the invention to provide flexible-to-soft shaped articles a high impact graft copolymer alone or in admixture with other polymers such as resilient to rubbery polymers, especially in sheet-like form.

It is another object of the invention to provide flexible-to-soft shaped articles which can be easily processed to shaped articles having a smooth surface and good mechanical properties and which can be thermoformed such as by deep drawing.

These and other objects and advantages of the invention will become obvious from the following detailed description.

THE INVENTION

The novel flexible-to-soft shaped articles of the invention are articles containing a vinyl chloride-acrylic acid ester graft copolymer containing 20 to 60% by weight of acrylic acid ester polymer and 40 to 80% by weight of vinyl chloride and 0 to 30% by weight of other ethylenically unsaturated comonomers copolymerizable with vinyl chloride grafted thereon and optionally containing at least one member of the group consisting of other plastics, fillers, processing aids and conventional additives, the weight percentages being based on the total weight of the graft copolymer and optionally at least one additional polymer selected from the group consisting of polymers of high heat distortion resistance, polymers which lower the Shore hardness and polymers imparting elastomeric properties. Preferably, the articles are in sheet-like form.

Examples of additional plastics which can be used in the invention in combination with the said graft copolymers are polymers which increase the heat distortion resistance such as acrylonitrile/butadiene/styrene copolymer (ABS), styrene/acrylonitrile copolymer (SAN), methylstyrene/acrylonitrile copolymer (MSAN), acrylonitrile/styrene/acrylate copolymer (ASA), styrene/maleic anhydride copolymer (PSMA), polyvinylidene fluoride (PVD), methyl methacrylate/butadiene/styrene copolymer (MBS), polymethyl methacrylate (PMMA) and polycarbonate (PC); polymers which lower the Shore hardness such as ethylene/vinyl acetate copolymers and terpolymers (EVAC, VAE): polymers which impart elastomeric properties to the mixture such as thermoplastic polyurethane (TPU), thermoplastic polyester elastomer (for example commercially available as Hytrel), polyether block amide (for example commercially available as Pebax), nitrile rubber (NBR) and ethylene/propylene/diene rubber (EPDM), and chlorinated polyethylene (CPE). In the manufacture of the elastomeric shaped articles, TPU is a particularly preferred further additive.

The graft copolymer of VC and acrylic acid ester (referred to hereinafter for simplicity as AE or acrylate) and optionally other monomers, which graft copolymer had been conceived as a high-impact (modifier) concentrate, contained 40 to 80% by weight, preferably 45 to 70% by weight, based on total weight of the graft copolymer, of units which are derived from the grafted-on monomer or monomers.

Correspondingly, the graft copolymer contains 20 to 60, preferably 30 to 55% by weight of a polymer consisting at least partially of AE units as the grafting base. The graft copolymer used in the invention may contain, in addition to the VC and AE units, additional units which are derived from other ethylenically unsaturated copolymerizable compounds. For example, these units can be derived from vinyl esters of carboxylic acids of the formula RCOOH wherein R is hydrogen or straight-chain or branched-chain alkyl of 1 to 20 carbon atoms such as vinyl formate, acetate, propionate, butyrate and laurate, especially vinyl acetate and vinyl propionate, alkyl methacrylate of 1 to 8 alkyl carbon atoms such as methyl, ethyl, propyl, butyl and ethylhexyl methacrylates, from styrene, from vinyltoluene, from vinyl fluoride and bromide, from vinylidene halides such as vinylidene chloride, from mono- and di-alkyl esters of maleic acid of 1 to 18 alkyl carbon atoms and fumaric acid, from vinyl ethers, from acrylonitrile or methacrylonitrile and from acrylamide or methacrylamide.

These comonomers can be present in the copolymer either as comonomers of the AE in the grafting base and/or cografted as comonomers of vinyl chloride. According to the invention, it is also possible to use, for example, graft copolymers in which these comonomers have been incorporated into the graft copolymer as a second graft phase, for example in an intermediate or subsequent grafting step.

Preferably the graft copolymer used in the invention contains, in addition to vinyl chloride and the acrylate units, at most 30% by weight, relative to the total weight of the graft copolymer, of units of the other comonomers mentioned. It has proved particularly advantageous if the amount of the monomers which by themselves form a "hard" homopolymer, such as for example vinyl chloride, account for 40 to 80%, especially 45 to 70%, by weight of the total weight of the graft copolymer. Among these "hard" monomers, vinyl chloride by itself is particularly preferred.

Particularly preferred acrylates are alkyl acrylates of saturated alcohols having 2 to 18 carbon atoms, especially butyl or 2-ethylehexyl acrylates or mixtures of these.

The graft copolymer of the invention may be prepared by processes known to those skilled in the art, which therefore do not require any further explanation here. These processes may be carried out as a solution, suspension or, preferably, emulsion polymerization, the latter preferably in an aqueous medium.

According to the invention, particularly good results are obtained if the graft copolymer has been prepared by grafting vinyl chloride onto polyacrylate, preferably polybutyl acrylate and in a preferred embodiment, the acrylate grafting base can be partially cross linked. Especially preferred graft copolymers are characterized as follows: 45 to 65% by weight, especially 55 to 65% by weight, of VC units grafted onto 35 to 55% by weight, especially 35 to 45% by weight, of polybutyl acrylate; a Shore A hardness of 80 to 96 a tensile strength of at least $15N/mm^2$, elongation at break of at least 200%, two damping maxima at $-60°$ to $-15°$ C. and $+60°$ to $+85°$ C., a decrease in modulus of shear within the range of $0°$ to $70°$ C. from about $170N/mm^2$ to about $60N/mm^2$, and processability on hot metal surfaces without sticking at about $170°$ to $200°$ C.

Flexible, aging-resistant shaped articles, preferably sheet-like structures, especially sheeting, can be produced without any problems from the graft copolymers, even when these are in the pure form. The shaped articles thus obtained are distinguished by smooth surfaces and good mechanical properties. This is particularly surprising since, although sheet-like structures can also be produced under certain conditions with other acrylate-based high-impact modifiers which are used for high-impact versions of PVC for outdoor use, such structures have completely inadequate properties, especially with respect to their strength. For example, sheeting produced by the invention from the graft copolymer exhibits noteworthy transparency although, for example, addition of the same graft copolymer in amounts of about 10% by weight to VC homopolymer gives cloudy to opaque products.

The graft copolymer of a preferred embodiment together with stabilizers conventionally used in PVC technology already exhibits an ideal pattern of properties for many applications. Thus, the products are distinguished by good flexibility without plasticizer migration being able to occur; they possess excellent low temperature properties; are stable to aging and weathering and have very good oil resistance; and the surfaces are smooth and homogeneous. Furthermore, the graft copolymer can without any problems be converted into shaped articles, especially sheet-like structures, which can readily be glued and printed, can be high frequency welded, are readily thermoformable and are distinguished by tensile strength, good tear strength, good elongation at break and good tear propagation resistance.

Frequently, special demands are made with respect to particular properties for specific applications and it has now been found that adaptation to such requirements is readily possible by blending with numerous other plastics as indcated above. Because of the excellent plasticizing characteristics and the chemical composition of the graft copolymer, such alloys can even be produced without special machinery. For example, homogeneous sheeting can be produced from a mixture of the graft copolymer with granules of PVC on normal PVC single-screw extruders or roll mills. In contrast, homogenizing PVC with some of the plastics mentioned is frequently impossible or only possible on special machinery.

Because of the good alloying capability, it is possible, where appropriate also by addition of a plurality of the said other plastics, to produce shaped articles which range from resilient to flexible or soft and which may also manifest a combination of different properties, for example increased heat distortion resistance coupled with softness or softness coupled with rubbery resilience.

In addition to the other plastics mentioned above, which are optionally also used, it is furthermore possible to incorporate other conventional additives into, or add such additives to, the graft copolymer. As examples thereof, there may be mentioned: processing aids and stabilizers which are usually employed in amounts of up to 5 parts by weight per 100 parts by weight of graft copolymer and, where appropriate, plastics additives. Fillers in the generally customary amounts which greatly depends on the intended use of the shaped articles produced can also be incorporated into the molding material used in the invention. Examples of other additives are flame-retardant and smoke-suppressing additives.

In the following examples there are described several preferred embodiments to illustrate the invention. However, it should be understood that the invention is not intended to be limited to the specific embodiments. The amounts given are by weight, unless stated otherwise.

The following polymers and additives were employed were used in the Examples:

VC/PAE graft polymer I=graft copolymer of 60% by weight of vinyl chloride grafted onto 40% by weight of partially cross-linked polybutyl acrylate VC/PAE graft polymer II=same as I but with 50% by weight VC content and 50% by weight acrylate content VC/PAE graft polymer III=same as I but with 45% by weight VC content and 55% by weight acrylate content VAE 651 (Wacker-Chemie)=ethylene/vinyl acetate copolymer with 65% by weight of VAC units and 35% by weight of E units PMMA (Plexiglas H8)=polymethyl methacrylate from Röhm Elastollan CVP 60AW=thermoplastic polyurethane (from Elastogran), Shore A60

Elvaloy 742 P=E/VAC/CO terpolymer from Dupont

Irganox 1076=antioxidant from Ciba-Geigy

Irgastab 17 MOK=sulfur-tin stabilizer from Ciba-Geigy

Irgastab T 22M=sulfur-tin stabilizer from Ciba-Geigy

Irgawax 371=Lubricant from Ciba-Geigy

Metablen W 300=acrylic-based high-impact modifier resin from Mitsui

Paraloid KM 323 B=acrylic-based high-impact modifier resin from Röhm and Haas

Pebax 2533=polyether block amide from Atochem

Sandufor VSU=UV absorber from Sandoz

Solef 1008=polyvinylidene fluoride from Solvay

Vinuran KR 3811=MSAN from BASF

Wachs E=Lubricant, montan ester wax from Hoechst

Dylarc 700=PSMA from Arco Chemical

CPE 3614A=chlorinated polyethylene from Dow Chemical, CL content 36%

In the perforation tests, the perforation work (Nm) and the damaging force (N) were calculated for a foil thickness of 1 mm and given as Nm/mm and N/mm, resp.

EXAMPLE 1

Formulation:
100 parts of VC/PAE graft polymer I
2 parts of (Irgastab T 22M) stabilizer
0.4 parts of (Wachs E) lubricant

| 0.2 parts of Irganox 1076 | light stabilizers, |
| 0.1 parts of Sandufor VSU | antioxidants |

Processing conditions:
preplasticization on a mixing mill: 165° C./5'
on a pilot calender: 195° C./195° C.
sheeting thickness: 0.4 mm
Test data:

| Test method | | DIN | Dimension | Test data |
|---|---|---|---|---|
| Perforation test | | 53 373 | | |
| at 23° C. | damaging force | | N/mm | 2,012.2 |
| | deformation at break | | mm | 22.3 |
| at 0° C. | damaging force | | N/mm | 1,370.7 |
| | deformation at break | | mm | 17.7 |
| at −30° C. | damaging force | | N/mm | 1,784.3 |
| | deformation at break | | mm | 15.3 |
| Hardness | | 53 505 | Shore A | 95 |
| | | | Shore D | 51 |
| Vicat softening point, Method A | | 53 460 | °C. | 77 |
| Tensile test | | 53 455 | | |
| Tensile strength at 23° C. | | | N/mm² | 28.80 |
| Elongation at break at 23° C. | | | % | 233 |

EXAMAPLE 2

Comparison

Formulation:
100 parts of Paraloid KM 323 B
0.5 parts of Irgastab T 22M
0.3 parts of Irgawax 371
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 40 |
| Vicat softening point, Method A | 53 460 | °C. | 74.5 |
| Tensile test | 53 455 | | |
| Tensile strength at 23° C. | | N/mm² | 9.04 |
| Elongation at break at 23° C. | | % | 138 |

Note:
numerous small specks in the sheeting, strong odor on calendering.

EXAMPLE 3

Comparison

Formulation:
100 parts of Metablen W 300
0.5 parts of Irgastab T 22M
0.3 parts of Irgawax 371
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 43 |
| Vicat softening point, Method A | 53 460 | °C. | 77 |
| Tensile test | 53 455 | | |
| Tensile strength at 23° C. | | N/mm² | 11.74 |
| Elongation at break at 23° C. | | % | 45 |

Note:
a deposit which is difficult to wipe away is present on the sheeting.

EXAMPLE 4

Invention

Formulation:
100 parts of VC/PAE graft polymer II
1.3 parts of Irgastab 17 MOK
Processing conditions:
preplasticization on a mixing mill: 165° C./5'
on a pilot calender: 195° C./195° C.
sheeting thickness: 0.2 mm
Test data:

| Test method | DIN | Dimension | Test data |
|---|---|---|---|
| Perforation test | 53 373 | | |
| at 23° C. perforation work | | Nm/mm | 20.1 |
| C. | | | 14.6 |
| −15° C. | | | 14.3 |
| −30° C. | | | 12 |
| 23° C. damaging force | | N/mm | 1244.9 |
| C. | | | 1166.8 |
| −15° C. | | | 1525.2 |
| −30° C. | | | 1599.5 |
| temperature brittle point | 53 372 | °C. | < −60 |
| Hardness | 53 505 | Shore A | 88 |
| | | Shore D | 36 |
| Tensile test | 53 455 | | |
| Tensile strength at 23° C. | | N/mm² | 24.17 |
| Elongation at break at 23° C. | | % | 270 |
| Tear propagation resistance (Graves angle test) | 53 515 | N/mm | 27 |

EXAMPLE 5

Invention

Formulation:
100 parts of VC/PAE graft polymer III
1.3 parts of Irgastab 17 MOK
Processing conditions:
preplasticization on a mixing mill: 165° C./5'
on a pilot calender: 195° C./195° C.
sheeting thickness: 0.2 mm
Test data:

| Test method | DIN | Dimension | Test data |
|---|---|---|---|
| Perforation test | 53 373 | | |
| at 23° C. perforation work | | Nm/mm | 17.2 |
| 0° C. | | | 13.1 |

| Test method | DIN | Dimension | Test data |
|---|---|---|---|
| −15° C. | | | 13.4 |
| −30° C. | | | 11.9 |
| at 23° C. damaging force | | N/mm | 1052.8 |
| 0° C. | | | 1048.2 |
| −15° C. | | | 1377.3 |
| −30° C. | | | 1525 |
| Low temperature brittle point | 53 372 | °C. | <−60 |
| Hardness | 53 505 | Shore A | 81 |
| | | Shore D | 27 |
| Tensile test | 53 455 | | |
| Tensile strength at 23° C. | | N/mm² | 17.35 |
| Elongation at break at 23° C. | | % | 242 |
| Tear propagation resistance (Graves angle test) | 53 515 | N/mm | 17.9 |

EXAMPLE 6

Invention

Formulation:
80 parts of VC/PAE graft polymer I
20 parts of Vinuran KR 3811
2 parts of Irgastab T 22M
0.4 parts of Wachs E
0.2 parts of Irganox 1076
0.1 parts of Sandufor VSU
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 70 |
| Vicat softening point, Method A | 53 460 | °C. | 92 |
| Tensile test | 53 455 | | |
| Tensile strength at | | | |
| 0° C. | | N/mm² | 39.79 |
| 23° C. | | | 32.38 |
| 80° C. | | | 12.9 |
| Elongation at break at | | | |
| 0° C. | | % | 138 |
| 23° C. | | | 182 |
| 80° C. | | | 265 |
| 100° C. | | | 281 |
| 140° C. | | | 188 |

EXAMPLE 7

Invention

Formulation:
70 parts of VC/PAE graft polymer I
30 parts of Vinuran KR 3811
2 parts of Irgastab T 22M
0.4 parts of Wachs E
0.2 parts of Irganox 1076
0.1 parts of Sandufor VSU
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 70 |
| Vicat softening point, Method A | 53 460 | °C. | 100 |
| Tensile test | 53 455 | | |
| Tensile strength at | | | |
| 0° C. | | N/mm² | 41.35 |
| 23° C. | | | 33.51 |
| 80° C. | | | 14.4 |
| Elongation at break at | | | |
| 0° C. | | % | 122 |
| 23° C. | | | 174 |
| 80° C. | | | 229 |
| 100° C. | | | 239 |
| 140° C. | | | 266 |

EXAMPLE 8

Formulation:
77 parts of VC/PAE graft polymer I
23 parts of Elvaloy 742 P
1.3 parts of Irgastab 17 MOK
1 Wachs E
Processing conditions:
preplasticization on a mixing mill: 165° C./5'
on a pilot calender: 195° C./195° C.
sheeting thickness: 0.2 mm
Test data:

| Test method | DIN | Dimension | Test data |
|---|---|---|---|
| Hardness | 53 505 | Shore A | 80 |
| | | Shore D | 28 |
| Tensile test | 53 455 | | |
| Tensile test at | | | |
| 23° C. | | N/mm² | 17.5 |
| 80° C. | | | 1.3 |
| Elongation at break at | | | |
| 23° C. | | % | 250 |
| 80° C. | | | 130 |
| Tear propagation resistance (Graves angle test) | 53 515 | N/mm² | 28.5 |
| Perforation test | 53 373 | | |
| Perforation work at | | | |
| 0° C. | | Nm/mm | 11.3 |
| −15° C. | | | 12.1 |
| −30° C. | | | 13.8 |
| Damaging force at | | | |
| 0° C. | | N/mm | 1220.8 |
| −15° C. | | | 1482.9 |
| −30° C. | | | 1692.6 |
| Low temperature brittle point | 53 372 | °C. | <−60 |

EXAMPLE 9

Formulation:
100 parts of VC/PAE graft polymer I
30 parts of VAE 651
1.3 parts of Irgastab 17 MOK
1 parts of Wachs E
Processing conditions:
preplasticization on a mixing mill: 165° C./5'
on a pilot calender: 195° C./195° C.
sheeting thickness: 0.2 mm
Test data:

| Test method | DIN | Dimension | Test data |
|---|---|---|---|
| Hardness | 53 505 | Shore D | 38 |
| Tensile test | 53 455 | | |
| Tensile test at | | | |
| 23° C. | | N/mm² | 26.1 |

| Test method | DIN | Dimension | Test data |
|---|---|---|---|
| 80° C. | | | 4.1 |
| Elongation at break at | | | |
| 23° C. | | % | 285 |
| 80° C. | | | 372 |
| Tear propagation resistance (Graves angle test) | 53 515 | | 36.9 |
| Perforation test | 53 373 | | |
| Perforation work at | | | |
| 0° C. | | Nm/mm | 11.7 |
| −15° C. | | | 12.7 |
| −30° C. | | | 5.6 |
| Damaging force at | | | |
| 0° C. | | N/mm | 1342.1 |
| −15° C. | | | 1645.9 |
| −30° C. | | | 1455.5 |
| Low temperature brittle point | 53 372 | °C. | <−60 |

EXAMPLE 10

Formulation:
50 parts of Elastollan CVP 60 AW (TPU)
50 parts of VC/PAE graft polymer I
1.3 parts of Irgastab 17 MOK
1 parts of Wachs E
Processing conditions:
mixing mill 145° C./5'
pilot calender 155° C./150° C.
sheeting thickness 0.2 mm
Test data:

| Test method | DIN | Dimension | Test data |
|---|---|---|---|
| Hardness | 53 505 | Shore A | 65 |
| | | Shore D | 19 |
| Tensile test | 53 455 | | |
| Tensile strength at | | | |
| 23° C. | | N/mm$^2$ | 22.75 |
| 80° C. | | | 4.92 |
| after heat aging (500 hours/120° C.) | | | 20.81 |
| Elongation at break at | | | |
| 23° C. | | % | 398 |
| 80° C. | | | 479 |
| after heat aging (500 hours/120° C.) | | | 196 |
| Tear propagation resistance (Graves angle test) on test strips of sheeting | 53 515 | N/mm | 15.8 |
| | | | 5.3 |
| Perfortion test at | | | |
| 0° C. perforation work | | Nm/mm | at 0° C. and −15° C. the test specimens do not break |
| | | | 20.4* |
| −15° C. | | | (*) 4 out of 6 samples do not break |
| −30° C. | | | |
| at 0° C. damaging force | | N/mm | at 0° C. and −15° C. the test specimens do not break |
| −15° C. | | | |
| −30° C. | | | 1092.9 |
| Low temperature brittle point | 53 372 | °C. | <−60 |
| Permanent set | 53 517 | | |
| C set at 23° C./24 hours | | % | 20.5 |
| at 70° C./24 hours | | | 61.8 |
| Resilience | 33 512 | relative scale unit | 24 |
| Density | 53 479 | g/cm$^3$ | 1.2069 |
| Abrasion | 53 515 | mm$^3$ | 34.9 |

EXAMPLE 11

Formulation:
70 parts of VC/PAE graft polymer I
20 parts of Vinuran KR 3811
10 parts of Pebax 2533
0.5 parts of Irgastab T 22M
0.3 parts of Irgawax 371
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 56 |
| Vicat softening point, Method A | 53 460 | ° C. | 90.5 |
| Tensile test | 53 455 | | |
| Tensile strength at 23°C. | | N/mm$^2$ | 25.87 |
| after heat aging (500 hours/120° C.) | | | 24.86 |
| Elongation at break at | | | |
| 23° C. | | % | 171 |
| 100° C. | | | 202 |
| 140° C. | | | 133 |
| 180° C. | | | 233 |
| after heat aging (500 hours/120° C.) | | | 143 |

EXAMPLE 12

Formulation:
55 parts of VC/PAE graft polymer I
30 parts of Solef 1008
15 parts of Elvaloy 742 P
0.5 parts of Irgastab T 22M
0.3 parts of Irgawax 371
Processing conditions:
preplasticization on a mixing mill: 165° C./5'
on a pilot calender: 195° C./195° C. sheeting thickness: 0.4 mm
Test data:

| Test method | DIN | Dimension | Test data |
|---|---|---|---|
| Hardness | 53 505 | Shore D | 44 |
| Vicat softening point, Method A | 53 460 | °C. | 67 |
| Tensile test | 53 455 | | |
| Tensile strength at 23° C. | | N/mm$^2$ | 29.34 |
| after heat aging (500 hours/120° C.) | | | 26.51 |
| Elongation at break at | | | |
| 23° C. | | % | 354 |
| 100° C. | | | 230 |
| 140° C. | | | 193 |
| 180° C. | | | 135 |
| after heat aging (500 hours/120° C.) | | | 194 |

Note:
sheeting surface is matt

EXAMPLE 13

Formulation:
50 parts of VC/PAE graft polymer I
25 parts of Dylarc 700
14 parts of VAE 651
11 parts of CPE 3614A
2.5 parts of stabilizer
1.5 parts of antioxidants Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 47 |
| Vicat softening point, Method A | 53 460 | °C. | 58 |
| Tensile test | 53 455 | | |
| Tensile strength at 23° C. | | N/mm² | 24 |
| after heat aging (500 hours/120° C.) | | | 25 |
| Elongation at break at 23° C. | | % | 270 |
| after heat aging (500 hours/120° C.) | | | 200 |

EXAMPLE 14

Formulation:
55 parts of VC/PAE graft polymer I
30 parts of PMMA
15 parts of Elvaloy 742P
2.5 parts of stabilizer
1.5 parts of antioxidants and lubricants
Processing conditions:
preplasticization on a mixing mill: 165° C./5'
on a pilot calender: 195° C./195° C.
sheeting thickness: 0.4 mm
Test data:

| Test method | DIN | Dimension | Test data |
|---|---|---|---|
| Hardness | 53 505 | Shore D | 53 |
| Vicat softening point, Method A | 53 460 | °C. | 82.5 |
| Tensile test | 53 455 | | |
| Tensile strength at 23° C. | | N/mm² | 24 |
| after heat aging (500 hours/120° C.) | | | 34 |
| Elongation at break at 23° C. | | % | 199 |
| after heat aging (500 hours/120° C.) | | | 142 |

EXAMPLE 15

Formulation:
20 parts of Elastollan CVP 60 AW
60 parts of VC/PAE graft copolymer I
20 parts of Elvaloy 742 P
1.3 parts of Irgastab 17 MOK
1 parts of Wachs E
Processing conditions:
mixing mill: 145° C./5'
pilot calender: 155° C./150° C.
sheeting thickness: 0.2 mm
Test data:

| Test method | DIN | Dimension | Test data |
|---|---|---|---|
| Hardness | 53 505 | Shore A | 69 |
| | | Shore D | 21 |
| Tensile test | 53 455 | | |
| Tensile strength at | | | |
| 23° C. | | N/mm² | 17.31 |
| 80° C. | | | 1.96 |
| after heat aging (500 hours/120° C.) | | | 20.2 |
| Elongation at break at | | | |
| 23° C. | | % | 312 |
| 80° C. | | | 198 |
| after heat aging (500 hours/120° C.) | | | 180 |
| Tear propagation resistance (Graves angle test) on test strips of sheeting | | N/mm | 19.5 |
| | | | 7.5 |
| Perforation test | 53 372 | | |
| at 0° C. perforation work | | Nm/mm | at 0° C. and −15° C. the test specimens do not break |
| −15° C. | | | |
| −30° C. | | | 20.5 |
| at 0° C. damaging force | | N/mm | at 0° C. and −15° C. the test specimens do not break |
| −15° C. | | | |
| −30° C. | | | 1592.2 |
| Low temperature brittle point | 53 372 | °C. | < −60 |
| Permanent set | 53 517 | | |
| C set at 23° C./24 hours | | % | 27.2 |
| at 70° C./24 hours | | | 61.3 |
| Resilience | 33 512 | relative scale unit | 17 |
| Density | 53 479 | g/cm³ | 1.1706 |
| Abrasion | 53 515 | mm³ | 144.9 |

EXAMPLE 16

Formulation:
20 parts of Elastollan
60 parts of VC/PAE graft copolymer I
20 parts of VAE 651
1.3 parts of Irgastab 17 MOK
1 parts of Wachs E
Processing conditions:
mixing mill: 145° C./5'
pilot calender: 155° C./150° C.
sheeting thickness: 0.2 mm
Test data:

| Test method | DIN | Dimension | Test data |
|---|---|---|---|
| Hardness | 53 505 | Shore A | 69 |
| | Shore D | 20 | |
| Tensile test | 53 455 | | |
| Tensile strength at | | | |
| 23° C. | | N/mm² | 20.72 |
| 80° C. | | | 2.5 |
| after heat aging (500 hours/120° C.) | | | 18.45 |
| Elongation at break at | | | |
| 23° C. | | % | 294 |
| 80° C. | | | 335 |
| after heat aging (500 hours/120° C.) | | | 230 |
| Tear propagation resistance (Grave angle test) on test strips of sheeting | | N/mm | 15.4 |
| | | | 4.5 |
| Perforation test | 53 372 | | |
| at 0° C. perforation work | | Nm/mm | at 0° C. and −15° C. the test specimens do not break |
| −15° C. | | | |
| −30° C. | | | 19.4 |
| at 0° C. damaging force | | N/mm | at 0° C. and −15° C. the test specimens do not break |
| −15° C. | | | |
| −30° C. | | | 1867 |
| Low temperature brittle | 53 372 | °C. | not tested |

-continued

| Test method | DIN | Dimension | Test data |
|---|---|---|---|
| point Permanent set | 53 517 | | |
| C set at 23° C./24 hours | | % | 32.8 |
| at 70° C./24 hours | | | 61.7 |
| Resilience | 33 512 | relative scale unit | 13 |
| Density | 53 479 | g/cm$^3$ | 1.193 |
| Abrasion | 53 515 | mm$^3$ | 155.7 |

Various modifications of the products of the invention may be made without departing from the spirit or scope thereof and it is to be understood that the invention is intended to be limited only as defined in the appended claims.

What we claim is:

1. A flexible to soft shaped article containing a vinylchloride acrylic acid ester graft copolymer containing 20 to 60% by weight of acrylic acid ester polymer and 40 to 80% by weight of vinyl chloride and 0 to 30% by weight of other ethylenically unsaturated comonomers of the group consisting of vinylesters of carboxylic acids of formula RCOOH wherein R is hydrogen or straight-chain or branched-chain alkyl of 1 to 20 carbon atoms, alkylmethacrylate of 1 to 8 alkyl carbon atoms, styrene, vinyltoluene, vinylfluoride and bromide, vinylidene halide, mono- and dialkylesters of maleic acid of 1 to 18 alkylcarbon atoms, fumaric acid, vinylether, acrylonitrile, methacrylonitrile, acrylamide and methacrylamide copolymerizable with vinyl chloride grafted thereon and containing at least one member of the group consisting of other plastics, fillers, processing aids and conventional additives, the weight percentages being based on the total weight of the graft copolymer.

2. An article of claim 1 wherein the graft copolymer contains 30 to 55% by weight of the acrylic acid ester.

3. An article of claim 1 wherein the graft copolymer contains 45 to 70% by weight of vinyl chloride and other ethylenically unsaturated monomers.

4. An article of claim 1 with 0% of other ethylenically unsaturated comonomer.

5. An article of claim 1 wherein the graft copolymer comprises 45 to 65% by weight of vinyl chloride grafted onto 35 to 55% by weight of polybutyl acrylate.

6. An article of claim 5 wherein 55 to 65% by weight of vinyl chloride is grafted onto 35 to 45% by weight of polybutyl acrylate.

7. An article of claim 1 in sheet form.

8. An article of claim 1 wherein acrylic acid ester polymer is based on at least one member of the group consisting of butyl acrylate and 2-ethylhexyl acrylate.

9. An article of claim 1 wherein the comonomer is grafted with vinyl chloride.

10. An article of claim 1 wherein the comonomer is in the acrylic acid ester polymer.

11. An article of claim 1 wherein the comonomer is grafted before or after the vinyl chloride in a separate polymerization step.

12. An article containing a vinyl chloride-acrylic acid ester graft copolymer containing 20 to 60% by weight of acrylic acid ester polymer and 40 to 80% by weight of vinyl chloride and 0 to 30% by weight of other ethylenically unsaturated comonomers of the group consisting of vinylesters of carboxylic acids of formula RCOOH wherein R is hydrogen or straight-chain or branched-chain alkyl of 1 to 20 carbon atoms, alkylmethacrylate of 1 to 8 alkyl carbon atoms, styrene, vinyltoluene, vinylfluoride and bromide, vinylidene halide, mono- and dialkylesters of maleic acid of 1 to 18 alkylcarbon atoms, fumaric acid, vinylether, acrylonitrile, methacrylonitrile, acrylamide and methacrylamide copolymerizable with vinyl chloride grafted thereon and containing at least one member of the group consisting of other plastics, fillers, processing aids and conventional additives, the weight percentages being based on the total weight of the graft copolymer and at least one additional polymer selected from the group consisting of polymers of high heat distortion resistance, polymers which lower the Shore hardness and polymers importing elastomeric properties.

13. An article of claim 12 wherein the additional polymer is thermoplastic polyurethane.

14. An article of claim 12 wherein the graft copolymer contains 30 to 55% by weight of the acrylic acid ester.

15. An article of claim 12 wherein the graft copolymer contains 45 to 70% by weight of vinyl chloride and other ethylenically unsaturated monomers.

16. An article of claim 12 with 0% of other ethylenically unsaturated comonomer.

17. An article of claim 12 wherein the graft copolymer comprises 45 to 65% by weight of vinyl chloride grafted onto 35 to 55% by weight of polybutyl acrylate.

18. An article of claim 12 wherein 55 to 65% by weight of vinyl chloride is grafted onto 35 to 45% by weight of polybutyl acrylate.

19. An article of claim 12 in sheet form.

20. An article of claim 12 wherein acrylic acid ester polymer is based on at least one member of the group consisting of butyl acrylate and 2-ethylhexyl acrylate.

21. An article of cliam 12 wherein the comonomer is grafted with vinyl chloride.

22. An article of claim 12 wherein the comonomer is in the acrylic acid ester polymer.

23. An article of claim 12 wherein the comonomer is grafted before or after the vinyl chloride in a separate polymerization step.

* * * * *